United States Patent
Raychaudhuri et al.

(10) Patent No.: US 11,608,460 B2
(45) Date of Patent: Mar. 21, 2023

(54) IONIC LIQUID ADDITIVES FOR USE AS AN ABSORBENT IN ABSORPTION CHILLERS

(71) Applicant: YAZAKI CORPORATION, Tokyo (JP)

(72) Inventors: Satyabrata Raychaudhuri, Thousand Oaks, CA (US); Amirhossein Mehrkesh, Camarillo, CA (US); George G. Tamas, Camarillo, CA (US); Stefan Maat, Camarillo, CA (US); Alberto Coronas Salcedo, Tarragona (ES); Daniel Salavera Muñoz, Tarragona (ES); Juan Prieto Gonzalez, Reus (ES)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/147,267

(22) Filed: Jan. 12, 2021

(65) Prior Publication Data
US 2021/0130669 A1  May 6, 2021

Related U.S. Application Data

(63) Continuation of application No. PCT/US2020/013326, filed on Jan. 13, 2020.

(60) Provisional application No. 62/792,553, filed on Jan. 15, 2019.

(51) Int. Cl.
*C09K 5/04* (2006.01)
*F25B 15/06* (2006.01)

(52) U.S. Cl.
CPC .............. *C09K 5/047* (2013.01); *F25B 15/06* (2013.01); *C09K 2205/132* (2013.01); *Y02B 30/62* (2013.01)

(58) Field of Classification Search
CPC .............. C09K 5/00; C09K 5/02; C09K 5/04; C09K 5/047; C09K 2205/132; F25B 15/06
USPC ................................................ 252/67, 68, 69
See application file for complete search history.

(56) References Cited

U.S. PATENT DOCUMENTS

| | | | |
|---|---|---|---|
| 6,155,057 A | 12/2000 | Angell et al. | |
| 8,696,928 B2* | 4/2014 | Seiler | C09K 5/047 252/69 |
| 2012/0011886 A1* | 1/2012 | Shiflett | F25B 15/06 62/476 |

(Continued)

OTHER PUBLICATIONS

Kim et al. (Surface tension and viscosity of 1-butyl-3-methylimidazolium iodide and 1-butyl-3-methylimidazolium tetrafluoroborate, and solubility of lithium bromide+1-butyl-3-methylimidazolium bromide in water, Korean J. Chem. Eng., 23(1), 113-116, 2006) (Year: 2006).*

(Continued)

*Primary Examiner* — Matthew R Diaz
(74) *Attorney, Agent, or Firm* — Perkins Coie LLP; Viola Kung

(57) ABSTRACT

This invention relates to using an imidazolium bromide ionic liquid as an additive to lithium bromide in the absorbent for an absorption chiller. The imidazolium bromide ionic liquid is useful to increase the working region and to lower the risk of crystallization in an absorption chiller. The invention provides an absorption chiller comprising a mixture of a refrigerant and an absorbent, and the absorbent comprises lithium bromide and one or more imidazolium bromide ionic liquids.

13 Claims, 4 Drawing Sheets

(56) References Cited

U.S. PATENT DOCUMENTS

| | | | |
|---|---|---|---|
| 2012/0247144 A1 | 10/2012 | Seiler et al. | |
| 2013/0031930 A1* | 2/2013 | Seiler | C09K 5/047 |
| | | | 62/476 |
| 2013/0031931 A1* | 2/2013 | Seiler | C09K 5/047 |
| | | | 62/476 |
| 2016/0175766 A1 | 6/2016 | Zehnacker et al. | |
| 2017/0343250 A1* | 11/2017 | Mehrkesh | F25B 15/06 |

OTHER PUBLICATIONS

Kim, K. S., et al., Surface tension and viscosity of 1-butyl-3-methylimidazolium iodide and 1-butyl-3-methylimidazolium tetrafluoroborate, and solubility of lithium bromide+1-butyl-3-methylimidazolium bromide in water, 2005, pp. 113-116.
International Search Report of PCT/US2020/13326, dated Apr. 24, 2020, 2 pages., dated Apr. 24, 2020.

\* cited by examiner

IONIC LIQUID ADDITIVES FOR USE AS AN ABSORBENT IN ABSORPTION CHILLERS

This application is a continuation of PCT/US2020/013326, filed Jan. 13, 2020; which claims the benefit of U.S. Provisional Application No. 62/792,553, filed Jan. 15, 2019. The contents of the above-identified applications are incorporated herein by reference in their entirety.

TECHNICAL FIELD

This invention relates to an absorption chiller comprising lithium bromide and one or more imidazolium bromide ionic liquids as the absorbent materials. The imidazolium bromide ionic liquid is used as an additive to lower the crystallization temperature of the absorbent.

BACKGROUND

Absorption chillers are designed to generate a cooling (chilling) effect by means of generating chilled water which can be used to extract heat from an air flow (e.g. in an air conditioning system). Absorption chillers create a chilling effect by going through a complete absorption-refrigeration cycle. The simultaneous heat and mass transfer of the refrigerant to and from its mixture with the absorbent is the main mechanism of producing the chilling effect in an absorption chiller. The absorbent in the system should have a great tendency towards the refrigerant by dissolving it readily under the operating conditions of the system. The absorption process will make it possible for the system to work at sub-atmospheric pressures (between 0.01-0.1 atm for a water-based absorption chiller) leading to the evaporation of the refrigerant at much lower temperatures than its normal boiling point.

In absorption chillers, the need for an electricity consuming part (i.e. a compressor) to pressurize the refrigerant vapor is addressed through the use of an appropriate absorbent. Latent heat is consumed for the evaporation of the refrigerant, which provides a means of chilling. The low pressure in the evaporator provides the benefit of evaporation of the refrigerant at lower temperatures, thereby making the system capable of producing a chilling effect at low temperatures. However, the very low pressure of the evaporator makes the condensation process of the vapor phase (in order for the cycle to be continued) more challenging. This is where an efficient absorbent is needed to thoroughly absorb the refrigerant vapor (which has been previously vaporized) by releasing latent heat to a cooling water stream and change it back into the liquid phase.

Like any other chemical/physical system, absorption chillers have their own drawbacks and limitations. Certain factors, such as crystallization of the absorbent in the system, can limit the operation range. The benefits and drawbacks of conventional absorption chillers are described as follows.

Benefits of an Absorption Chiller:
  Low electricity operational cost—The only electricity consuming part in the system is a relatively small pump, which is used to circulate the absorbent-refrigerant mixture within the system. This fact makes absorption chillers an ideal choice for countries which do not have well developed infrastructures for the supply of electricity.
  It is a closed system in which almost no refrigerant (commonly water) is wasted.
  Ability to work in both dry and humid climates.
  It can be driven by low temperature heat sources such as solar thermal collectors and waste heat.

Drawbacks:
  Water-lithium bromide (LiBr) salt is a commonly used refrigerant-absorbent (working) pair in absorption chillers. LiBr is a very efficient absorbent for water refrigerant due to its high hygroscopicity. LiBr, which as a pure salt has a melting temperature of 552° C., can absorb water to a high enough degree such that it becomes completely dissolved in the water it has absorbed.

LiBr is a highly hygroscopic salt that can readily absorb water vapor. An issue with LiBr is its limited solubility in water and the risk of crystallization of LiBr in the absorption chiller system. This can occur when the temperature of the cooling water falls significantly in the absorber or too much of the water refrigerant is released in the generator. Crystallization of solid particles of LiBr out of the liquid solution is always an issue, especially at higher concentrations. This can cause damage to the system and make a costly corrective action necessary.

Involved control procedures are needed to avoid the crystallization of LiBr within the system. Therefore, there is a need for absorption chillers having less problematic absorbent materials compared with LiBr.

DETAILED DESCRIPTION OF THE INVENTION

The inventors have discovered that adding a particular type or types of imidazolium-based bromide ionic liquid additive at an optimum amount to a conventional lithium bromide-water working pair of an absorption chiller, expands the solubility range of the absorbent materials in water, thereby decreasing the crystallization risk in the apparatus. The selected imidazolium bromide ionic liquid additives expand the working region of the absorption chillers.

Figure 1:
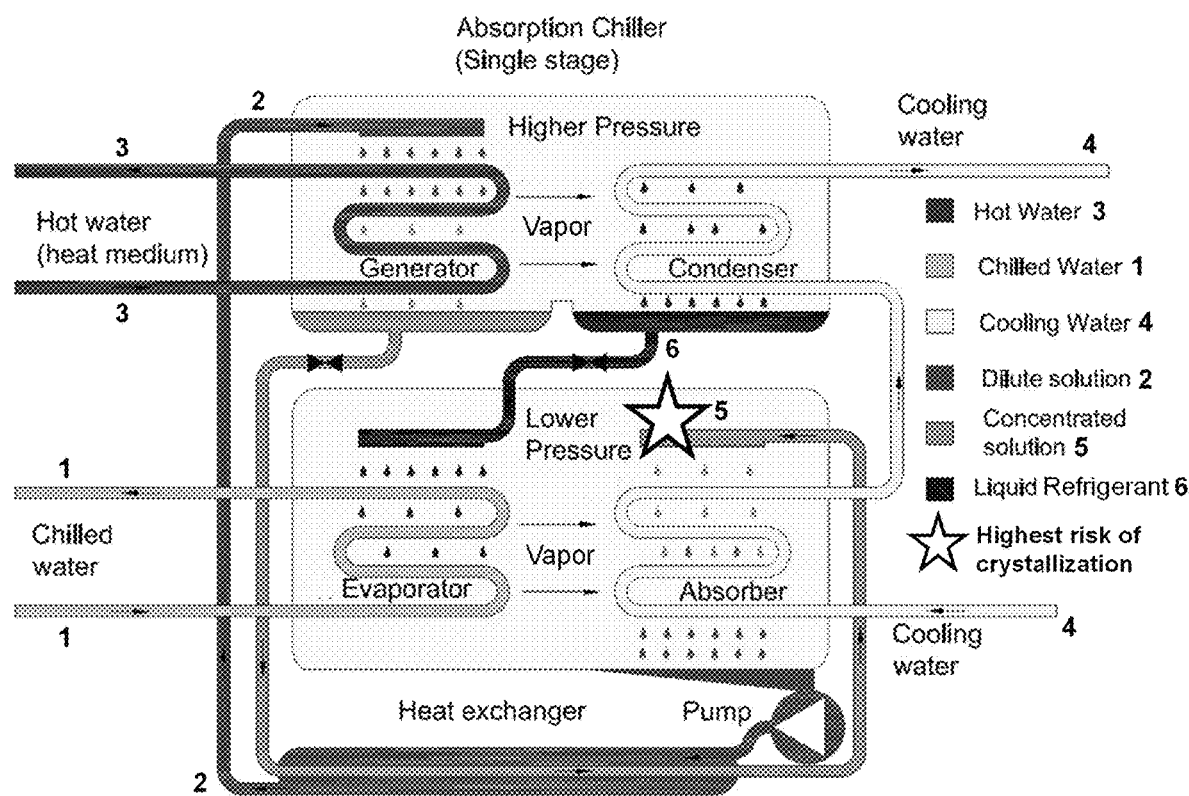
FIG. 1 illustrates an absorption chiller.

FIG. 1 illustrates a schematic of an absorption chiller. An absorption chiller is a machine that utilizes a heat source (e.g., direct flame, hot water, steam, solar energy, waste heat etc.) to drive a cooling process. A mixture of a refrigerant and an absorbent is present in the absorber compartment and in the generator compartment of the system.

The present invention provides an absorption chiller comprising an absorber compartment and a generator compartment, wherein both compartments comprise a mixture of a refrigerant and an absorbent, wherein the absorbent comprises 91-97% by weight of LiBr and 3-9% by weight of an ionic liquid.

In the absorption chiller of the present invention, a working pair comprises an absorbent and a liquid refrigerant; the absorbent is paired (dissolved) with the liquid refrigerant. A refrigerant is a liquid compound used to undergo evaporation in the evaporator compartment of an absorption chiller to produce a chilling effect. A refrigerant in general has appropriate properties for use in such a system, such as low melting point, low-to-medium boiling point, low toxicity, low flammability, low corrosivity, low viscosity, high thermal conductivity, high wettability, and high heat of evaporation.

A pure refrigerant is preferred for chilling purposes in the evaporator compartment. The refrigerant needs to be evaporated from its liquid solution with the absorbent (i.e. refrigerant in the gas phase) and then condensed into a liquid phase before being sent to the evaporator compartment. An absorbent has the role of absorbing the refrigerant vapor in the absorber compartment and transferring it from vapor phase to liquid phase. The absorber compartment provides a weak (i.e. relatively dilute) solution of the absorbent in the refrigerant to the generator compartment.

The generator compartment has the sole role of transferring a portion of the refrigerant from the liquid phase (in solution with the absorbent) to the vapor phase (partial evaporation), thereby performing a vapor-liquid separation procedure. The absorbent material generally has a negative role in the generator compartment, since it decreases the vapor pressure of the refrigerant, hindering its evaporation. However, the existence of absorbent in the generator compartment cannot be avoided due to the fact that it is dissolved in the refrigerant stream (working pair solution) incoming from the absorber compartment. An absorption-refrigeration cycle can be accurately modeled using fundamental thermodynamics. The generator compartment provides a strong (i.e. relatively concentrated) solution of the absorbent in the refrigerant to the absorber compartment.

Water is a preferred refrigerant because it is readily available, non-toxic, non-flammable, non-explosive, and has a relatively high liquid range. Water also has an exceptionally high mass-based enthalpy of vaporization and specific heat capacity. Due to this combination of properties, water is a good heat transfer medium for heat exchange purposes.

An ionic liquid (IL) is a poly-atomic salt with organic cations and organic or inorganic anions, usually defined as having a melting temperature of 100° C. or lower.

Many ionic liquids (ILs) are not strongly hydrophilic due to the dispersion of their electron charge density over a large area of the anion or cation in contrast to highly polar water molecules (which are of small size). This renders many ILs unsuitable to use as sole absorbents with water as the refrigerant in an absorption chiller. However, the inventors have identified certain ILs to be used as additives to LiBr as absorbents in an absorption chiller, which reduces the risk of the crystallization of LiBr within the system and lowers surface tension, while maintaining other desired properties such as high hygroscopicity and low viscosity.

The inventors have selected the ionic liquids having a general Formula I, which have a high affinity towards water. When a small amount of Formula I compounds are used as additives to LiBr as absorbents in an absorption chiller, they lower the crystallization temperature and surface tension of the LiBr-water solution, without adversely affecting its thermophysical properties or performance.

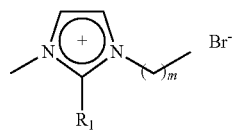

Formula I

Formula I is as shown above, wherein $R_1$ is H or methyl, and m=0 to 5.

In one embodiment, $R_1$ is methyl, and m=0, 1, 2, 3, 4, or 5; for example, m=3.

In one embodiment, $R_1$ is H, and m=0, 3, or 5; for example, m=3.

Formula I compounds are 1-methylimidazolium-based ionic liquids with bromide (Br⁻) anion and a linear (non-branched) alkyl side chain having 1-6 carbon atoms attached to the second nitrogen (N) atom. Preferred Formula I compounds for the present invention include 1-butyl-3-methylimidazolium bromide ([BMIm]Br, m=3), 1-butyl-2,3-dimethylimidazolium bromide ([B2MIm]Br, m=3), 1,3-dimethylimidazolium bromide ([DMIm]Br, m=0), and 1-hexyl-3-methylimidazolium bromide ([HMIm]Br, m=5).

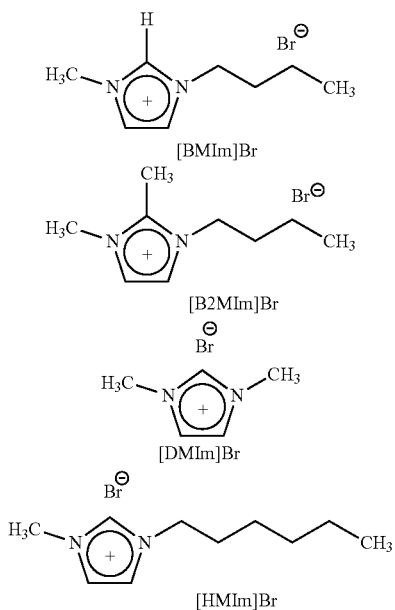

Crystallization of solid solutes (e.g. salts) dissolved in liquid solvents normally occurs when the temperature of solution falls below the saturation temperature. In theory, any impurity can lower the crystallization temperature of the liquid solutions to some extent. The inventors selected the IL additives that share the same type of anion (bromide) with LiBr to decrease the crystallization temperature further by increasing the chance to form deep eutectic mixtures. A eutectic mixture is generally defined as a mixture of two or more chemical components which do not interact to form a third chemical component but, at a certain ratio, inhibit the crystallization process of one another resulting in a system having a lower melting point than either of the components. The melting point of a eutectic mixture is lower than the melting point of its constituents. The main reason for this phenomenon of decreased crystallization temperature is that due to having similar size, shape and electron charge density of the shared bromide anion, there is no higher or lower tendency for the cations to form crystalline particles with a different anion, thus the solubility of the salts in the water solutions is increased and the chance of forming crystal particles is lowered.

In Formula I, m=0 to 5 indicates the length of the side chain of the cation. A longer side chain increases the non-polar portion of the cation. The inventors have discovered that an increased side chain length of the imidazolium IL additive cation more effectively separates the ionic constituents from each other, thereby weakening the electrostatic forces among them, and decreasing the risk of crystallization of the absorbent. The increased side chain length, however, increases the viscosity of the work pair solution. The inventors therefore have selected an optimum value for m being 0 to 5. If the sidechain length becomes too short, electrostatic forces between the ionic constituents become dominant and increase the risk of crystallization. If m>5, the sidechain length becomes too long to effectively become hydrated by water molecules, and van der Waals forces between the weakly polar sidechains of the cations become more prominent, which adversely affects the ability of the additive to lower the crystallization temperature of the absorbent in the solution. Moreover, for long side chains, the viscosity of the working pair solution is strongly increased, making it more difficult to pump the solution through the system. The inventors have demonstrated that imidazolium-bromide additives [DMIm]Br (m=0), [BMIm]Br (m=3), [B2MIm]Br (m=3), and [HMIm]Br (m=5), when used as additives with LiBr in an absorbent, all suppress the crystallization temperature of the LiBr absorbent by itself.

Substitution of the hydrogen (H) atom with a methyl group ($CH_3$) at the $R_1$ position of the imidazolium-Br ILs, as indicated in Formula I, increases their chemical stability against deprotonation. For example, the inventors have found that [B2MIm]Br (dimethyl imidazolium) has higher thermal stability compared to [BMIm]Br (monomethyl imidazolium). Specifically, a 24-hour isothermal thermogravimetric analysis (TGA) of [B2MIm]Br (m=3) at 100° C. showed 0.02 wt % mass loss of the compound while, under similar conditions, [BMIm]Br mass loss was about 0.2 wt %, or about ten times higher. This indicates that [B2MIm]Br has approximately 10 times greater thermal stability at 100° C. compared to [BMIm]Br.

It is important that the imidazolium IL additive has a linear alkyl side chain, and not a branched alkyl side chain. The inventors have synthesized and tested 1-isobutyl-3-methylimidazolium bromide ([IsoBMIm]Br), which is a 1-methyimidazolium bromide based ionic liquid with a branched alkyl side chain. The chemical structure of [IsoBMIm]Br is shown below.

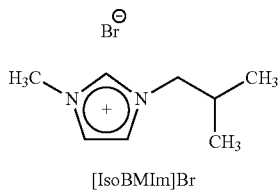

[IsoBMIm]Br

Unlike the imidazolium IL additives having a linear alkyl side chain, [IsoBMIm]Br additive does not lower the crystallization temperature of LiBr, at a comparable vapor pressure.

The above mentioned linear/branched ionic liquids are synthesized following the generic protocol shown in Scheme 1.

Scheme 1

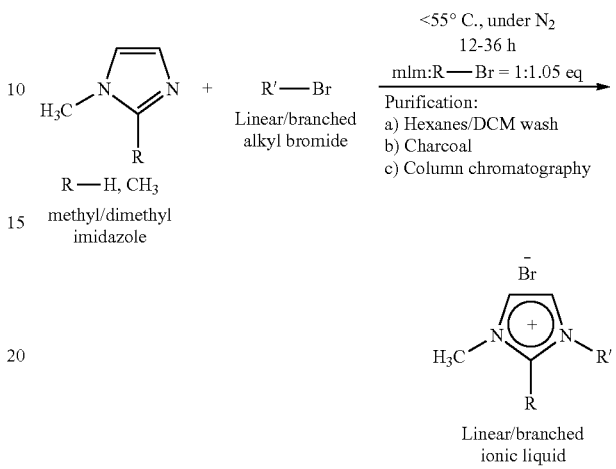

Linear/branched ionic liquid

The present invention provides an absorption chiller comprising an absorber compartment and a generator compartment, wherein both compartments comprise a refrigerant and an absorbent, the absorbent comprises 91-97% by weight of LiBr and 3-9% by weight of an ionic liquid of Formula I. Preferred Formula I compounds include 1-butyl-3-methylimidazolium bromide ([BMIm]Br), 1-butyl-2,3-dimethylimidazolium bromide ([B2MIm]Br), 1-hexyl-3-methylimidazolium bromide ([HMIm]Br), 1,3-dimethylimidazolium bromide ([DMIm]Br), and any combination thereof.

Working pair solutions with the total LiBr+IL absorbent concentration of between 52 and 57% (in the weak solution), of which 91-97 wt % being LiBr and 3-9 wt % being the IL additive, are useful in an absorption chiller. Preferred absorbent comprises 93-96 wt % of LiBr and 4-7 wt % of IL additives. More preferred absorbent comprises 95 wt % of LiBr and 5 wt % of IL additives. At greater than 9 wt % concentration of IL in the absorbent, the vapor pressure of the working solution is too high, as the hygroscopicity of LiBr salt is hindered by the higher concentration of IL. At less than 3 wt % of IL in the absorbent, the effect of additive on the suppression of the crystallization temperature is not significant. In one embodiment, the weight ratio IL to LiBr is 1:10 to 1:30, 1:15 to 1:25, or 1:17 to 1:22.

Absorption chillers having pure LiBr absorbent can only operate within a relatively narrow range of the concentration of LiBr in water. The process is impaired if the solution of LiBr in water is either too concentrated or too dilute. A very low amount of water is insufficient to keep LiBr in the liquid phase due to the high melting point of LiBr (552° C.), causing the absorbent to crystallize out of the liquid working pair. A very high amount of water (too dilute of a solution) would fully solvate the $Li^+$ cations and $Br^-$ anions, disturbing the capability of the system to work continuously and efficiently. A narrow (~5 wt %) change in LiBr concentration in the water, from ~57% LiBr/43% water in the weak (relatively dilute) stream to ~62% LiBr/38% water in the strong (relatively concentrated) stream, is typically required to produce an acceptable amount of cooling load while preventing the solution from being too concentrated or too dilute.

In the absorption chiller of the present invention, the absorber compartment provides a weak solution of refrigerant and LiBr/IL absorbent to the generator compartment, where the weight percent of the absorbent is 52%-57% of the solution.

In the absorption chiller of the present invention, the generator compartment provides a strong solution of refrigerant and LiBr/IL absorbent to the absorber compartment, where the weight percent of the absorbent is in general 56%-62% of the solution. However, the weight percent of the absorbent in the strong solution may vary depending on the chiller design and operation.

The present working pairs of absorbent and refrigerant (i.e. the mixture of LiBr/IL additive and refrigerant), have sufficiently low viscosity such that the circulation of the absorbent-refrigerant mixture within the system does not create an unreasonable strain on the system components. The crystallization temperature of LiBr/IL additive in the refrigerant is lower than the working temperature range of the absorption chiller to avoid the crystallization of LiBr/IL additive in the system.

The following examples further illustrate the present invention. These examples are intended merely to be illustrative of the present invention and are not to be construed as being limiting.

EXAMPLES

Example 1. Measuring Crystallization Temperature and Vapor Pressure of an Absorbent-Refrigerant Working Pair To carry out the experimental measurements, solutions with various concentrations of LiBr+IL absorbent in water were prepared by weighing the required amounts of pure ionic liquid and LiBr and mixing them with DI water. The mixtures were sonicated until homogeneous solutions were formed. For a better accuracy of the results, the final water amount in the freshly prepared samples was evaluated through Karl Fischer titration methodology. This procedure accounts for any moisture absorbed during the preparation stage or pre-existent in the starting materials.

To determine the crystallization temperature, each solution was cooled down while turbidity was measured. In brief, each solution was filled into a jacketed beaker around which a thermal fluid was circulated to maintain a desired temperature that was controlled within 0.01° C. The solutions were cooled down at a slow cooling rate (−0.8° C./min) to make sure the instance of formation of first solid particles was captured by the turbidity probe.

The vapor pressure of the working pairs is used to determine the degree to which an absorbent can capture or release the refrigerant vapor. An automated machine was used to collect the vapor pressure data. A triple expansion method with 300 seconds of equilibration time followed by two 180-second periods of residence time was used to measure the vapor pressures of the working samples.

Example 2. Comparison Between Working Pairs

To make a relevant comparison between the LiBr-water and LiBr/IL additive-water working pairs, a 4-percent difference in the concentration of the absorbent was allowed between the weak and strong solutions. Also, a range of 2-8° C. for the temperature in the evaporator was considered to be enough for achieving good cooling quality in all cases. For all the working pairs tested, as well as for their LiBr-water counterparts, a temperature range of 35-36° C. at the bottom of the absorber and 42-46° C. at the top of the absorber (entry to the absorber and also the most risky point for crystallization) was assumed. The concentration of working pairs (in the strong and weak stage) for each case, along with the LiBr-water counterpart, on the basis of delivering the same cooling performance, are listed in Table 1.

To evaluate the effect of addition of different IL additives to the LiBr-water solutions, on the performance of absorption chillers, a parameter called the "Margin of Safety [° C.]" is defined. The Margin of Safety is the difference between the temperature of the strong solution at the inlet of the absorber and the crystallization temperature of the working pair at that concentration. A higher Margin of Safety points towards a better performance. This parameter can quantify the crystallization temperature suppression power of different IL additives. Data on the Margin of Safety for different working pairs, as well as the concentration of strong and weak LiBr-water solutions, with and without IL additives, are listed in Table 1 for different cases. In each case, shown in the first column of Table 1, a solution of LiBr/IL-water is compared with a solution of LiBr-water on the basis of having the same temperature and pressure in the evaporator (same cooling performance) and same concentration difference of 4 percent between the strong and weak solutions. For example, in Case 1, a 54% concentration of LiBr/[BMIm]Br IL (95:5 mass ratio) in water gives a vapor pressure equal to that of a solution of 56.7% LiBr in water. The LiBr-water working pair is listed in the row below each new working fluid in order to evaluate the degree of improvement on the same basis of exerting equal vapor pressure in the absorber/evaporator.

The concentration of the working pairs with IL additives, as well as their LiBr-water counterparts, are chosen in the way that they could generate a temperature of the evaporator in the range of 2-8° C., which provides acceptable cooling quality.

Table 1 shows results for IL additives [BMIm]Br, [B2MIm]Br, [DMIm]Br, [HMIm]Br, and [IsoBMIm]Br. Cases 1-4 all significantly improve the Margin of Safety in terms of crystallization at the inlet of the absorber, whereas in Case 5 for [IsoBMIm]Br the Margin of Safety is decreased, when comparing with pure LiBr absorbent.

TABLE 1

Crystallization suppression of different absorbents with water as refrigerant.

| Case # | Absorbent | Absorbent Mass % in Working Pair | | Crystallization Temp [° C.] | Vapor Pressure In EVAP [kPa] | Temp in EVAP [° C.] | Margin of Safety [° C.] |
| --- | --- | --- | --- | --- | --- | --- | --- |
| | | Strong (concentrated) | Weak (dilute) | | | | |
| 1 | 95% LiBr: 5% [BMIm]Br | 58 | 54 | −19.7 | 0.73 | 2.6 | 62.4 |
| | LiBr | 60.7 | 56.7 | 24.4 | | | 18.7 |

TABLE 1-continued

Crystallization suppression of different absorbents with water as refrigerant.

| Case # | Absorbent | Absorbent Mass % in Working Pair | | Crystallization Temp [° C.] | Vapor Pressure In EVAP [kPa] | Temp in EVAP [° C.] | Margin of Safety [° C.] |
|---|---|---|---|---|---|---|---|
| | | Strong (concentrated) | Weak (dilute) | | | | |
| 2 | 95% LiBr: 5% [B2MIm]Br | 58 | 54 | −18.3 | 0.95 | 6.3 | 60.4 |
| | LiBr | 58.5 | 54.5 | 9.8 | | | 33.1 |
| 3 | 95% LiBr: 5% [DMIm]Br | 58 | 54 | 0.9 | 0.90 | 5.5 | 42.6 |
| | LiBr | 59.13 | 55.13 | 14.3 | | | 28.9 |
| 4 | 95% LiBr: 5% [HMIm]Br | 58 | 54 | 3.0 | 0.87 | 5.1 | 38.9 |
| | LiBr | 59.3 | 55.3 | 15.4 | | | 27.6 |
| 5 [Comparative] | 95% LiBr: 5% [IsoBMIm]Br LiBr | 62.2 58.5 | 58.2 54.5 | 32 9.8 | 0.95 | 6.3 | 14.3 30.9 |

Thermophysical properties of different working pairs (with and without IL additives) are listed in Table 2.

TABLE 2

Thermophysical Properties.

| Strong (Concentrated) Working Pair (mass %) | Surface Tension [mN/m] @ 22° C. | Viscosity [cP] @ 80° C. | Thermal Conductivity [W/m · K] @ 22° C. | Heat Capacity [J/kg · K] @ 22° C. |
|---|---|---|---|---|
| LiBr 60% - water | 92.5 | 2.47 | 0.413 | 1816 |
| LiBr:[BMIm]Br (95:5) 58% - water | 62.5 | 2.42 | 0.350 | 1915.5 |
| LiBr:[B2MIm]Br (95:5) 60% - water | 61.1 | 2.65 | 0.335 | 1795.9 |
| LiBr:[DMIm]Br (95:5) 58% - water | 85.7 | 2.42 | 0.348 | 1897.1 |
| LiBr:[HMIm]Br (95:5) 58% - water | 47.5 | 2.51 | 0.349 | 1912.14 |
| LiBr:[IsoBMIm]Br (95:5) 58% - water | 57.3 | 2.56 | 0.325 | 1827.3 |

Table 2 shows the additional benefit that LiBr/IL-water working pairs provide of lowering surface tension compared to the LiBr-water working pair, which indicates that even a small amount of ionic liquid additive can act as a surfactant and lower the surface tension of the final solution. Lower surface tension can translate to a better wettability of the tubes in the absorber/generator chambers. In the two chambers, the working pair solution wets the outer surface of the internal tubes. A better wettability of the tubes will result in higher heat and mass transfer rates thereby a better thermal efficiency in the system and potentially a smaller heat exchanger. Table 2 shows that there is no significant difference in the other important thermophysical properties (i.e. heat capacity, thermal conductivity and dynamic viscosity) between the LiBr/IL-water solution and pure LiBr-water solution.

In working region diagrams of an absorption chiller, binary data of Pressure and Temperature (P, T) are depicted for the different compartments of the chiller. A generic working region diagram is presented in FIG. 2. Pressure is plotted on the y-axis and temperature on the x-axis. Therefore, all points on any horizontal line have the same pressure value and all points on any vertical line have the same temperature value. Typically, absorption chillers operate at two working pressures (i.e. a higher pressure and a lower pressure) in different compartments of the system. Typically, both working pressures are vacuum pressures, i.e. they are lower than atmospheric pressure. Among the four main compartments of an absorption chiller (Evaporator, Absorber, Generator, and Condenser) two pairs of compartments each operate together at the same pressure. The absorber and evaporator compartments are interconnected and operate at the lower pressure, while the generator and condenser compartments are also interconnected and operate at the higher pressure. Generally, working region diagrams show how well an absorption chiller can perform, for example, whether the cooling quality is enough, and/or whether the temperature in the absorber is safe to avoid crystallization.

Since only the refrigerant changes phase in the evaporator and condenser of an absorption chiller, the pressure in these two compartments and consequently the pressure everywhere in the system can be found by knowing only the type of the refrigerant (herein water) and the temperature of the two aforementioned compartments. Evaporator temperature is dictated by the cooling requirements and is normally at about 2-8° C. in an LiBr—H$_2$O based system. Condenser temperature is directly influenced by the cooling water temperature (which also depends on the temperature and humidity of the outside air) and is normally between 35 and 42° C.

Figure 2:
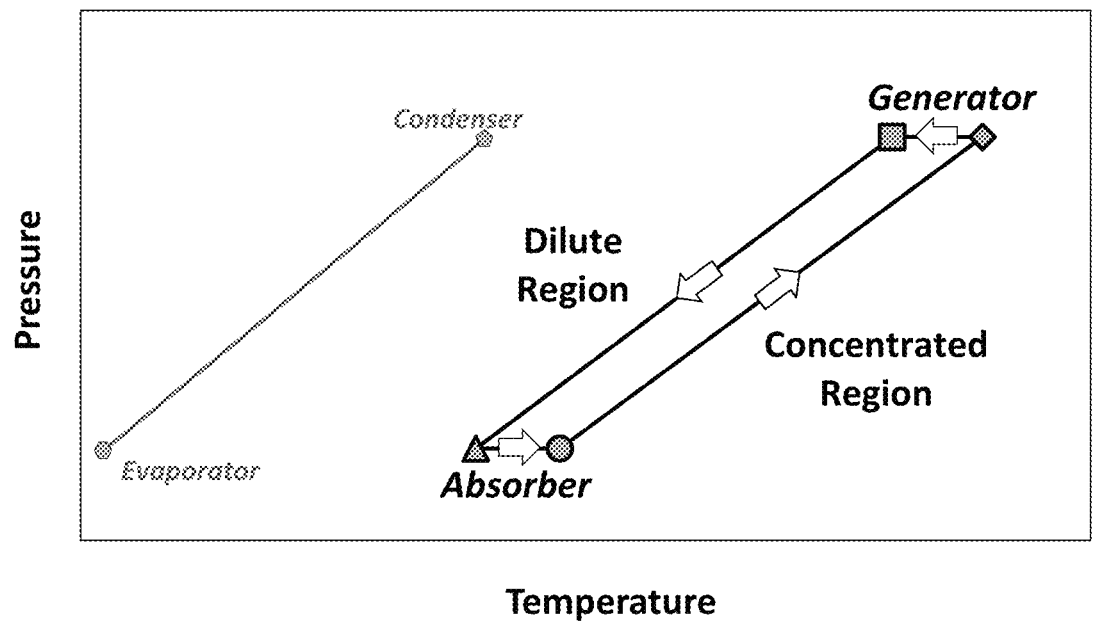
FIG. 2 shows a generic performance cycle or working region diagram for an absorption chiller.
Figure 3:
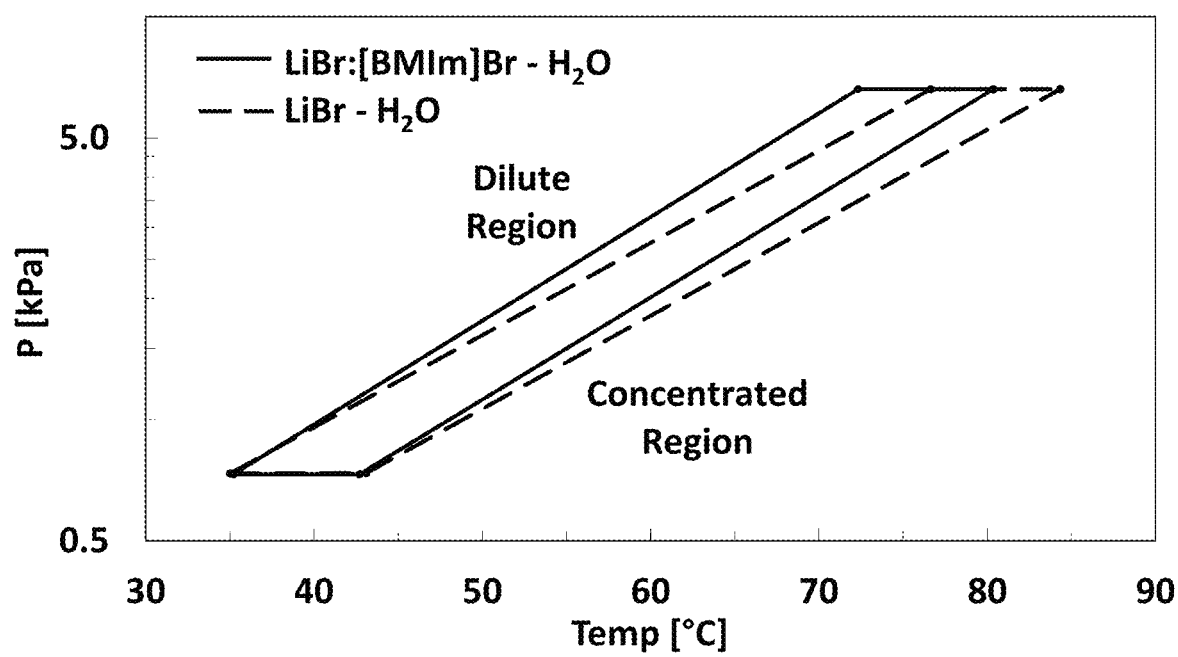
FIG. 3 shows the performance cycle of LiBr:[BMIm]Br (95:5)-water and LiBr-water working pairs.
Figure 4:
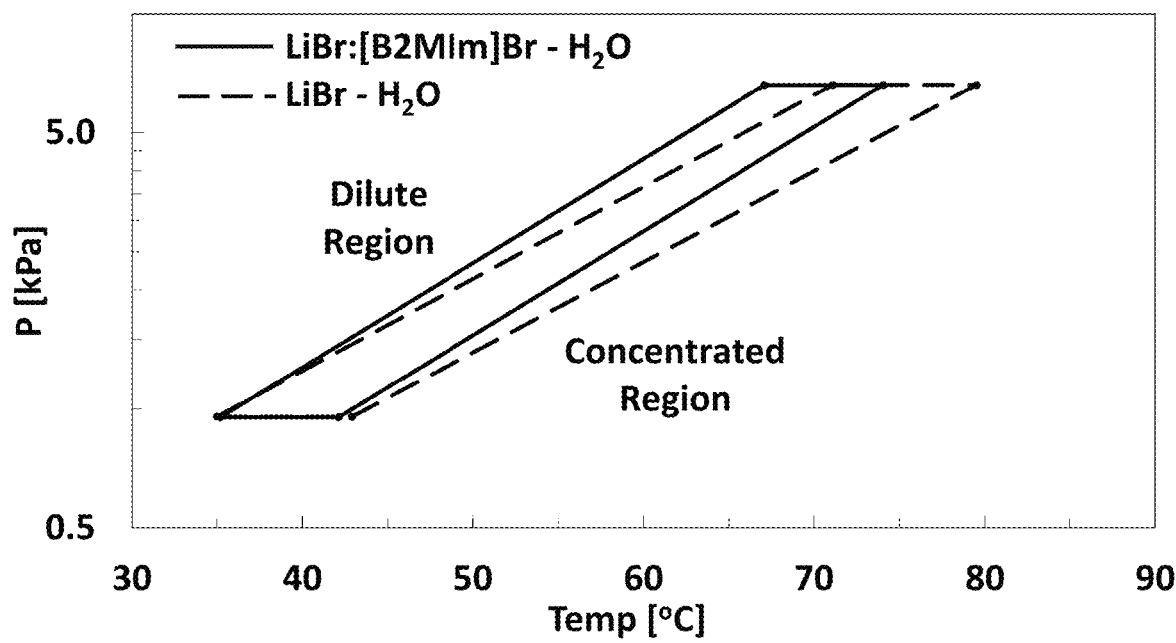
FIG. 4 shows the performance cycle of LiBr:[B2MIm]Br (95:5)-water and LiBr-water working pairs.
Figure 5:
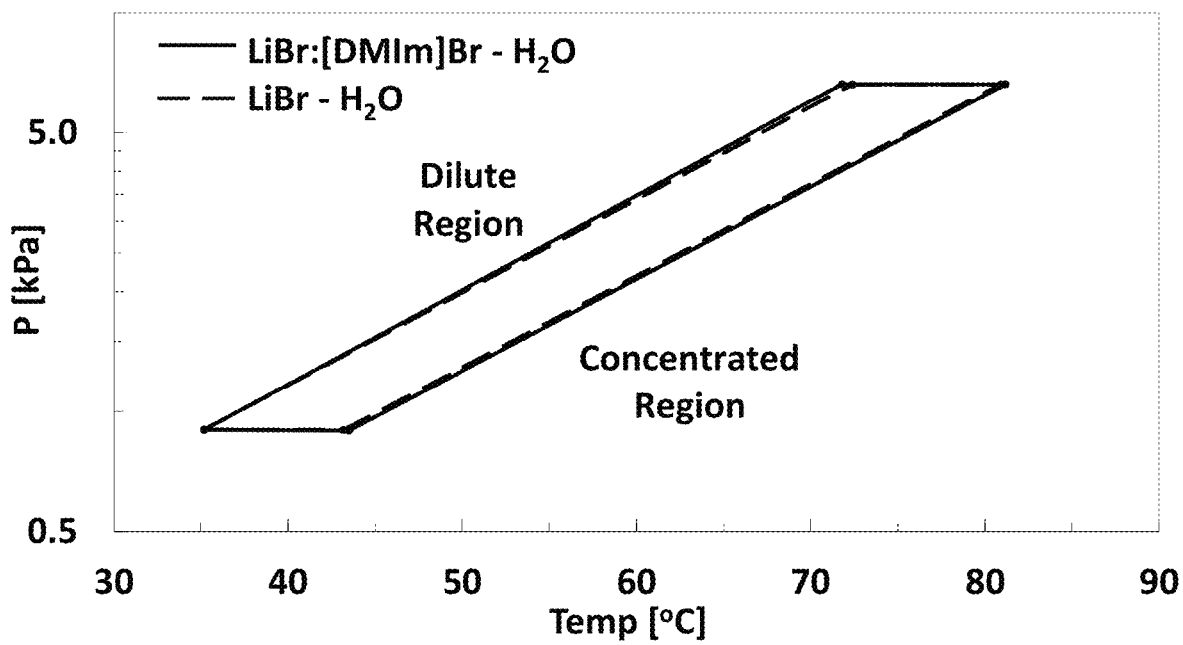
FIG. 5 shows the performance cycle of LiBr:[DMIm]Br (95:5)-water and LiBr-water working pairs.
Figure 6:
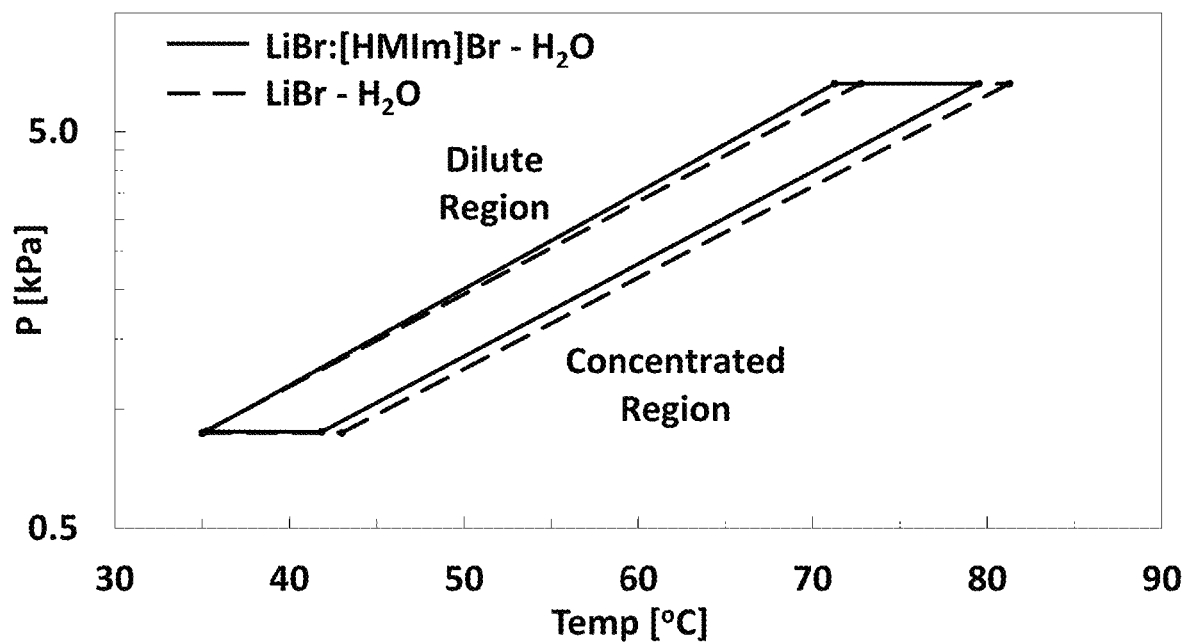
FIG. 6 shows the performance cycle of LiBr:[HMIm]Br (95:5)-water and LiBr-water working pairs.

The parallelogram shape working region shown in FIG. 2 is made of four main operating points. Two lower points with same pressure values (low P) depict the pressure and temperature in the top and bottom of the absorber, and the two upper points with the same pressure values (high P) depict the pressure and temperature in the top and bottom of the generator. Although the concentrations of the working pair solutions are different at the bottom and top of the absorber and generator, having different temperature values compensates for the difference in the concentration in a way that pressure will remain the same at the upper and lower parts of these two compartments. Generally, working region diagrams show how well an absorption chiller can perform, for example, whether the cooling quality is enough, and/or whether the temperature in the absorber is safe to avoid crystallization.

To further evaluate the performance of absorption chillers working with working pairs 1-4 in Table 1, working region diagrams were prepared as shown in FIGS. 3 to 7. As in the generic diagram of FIG. 2, in FIGS. 3-7 each set of four points in a parallelogram shape show the pressure and temperature conditions in the top and bottom of the absorber (low P), and in the top and bottom of the generator (high P). Conditions in the evaporator and condenser are not shown in FIGS. 3 to 7, as these are not needed to illustrate the benefits of the working pairs 1-4 listed in Table 1.

FIGS. 3-7 show the performance cycles of the respective LiBr/IL-water and LiBr-water working pairs listed in Table 1. IL additives tested were [BMIm]Br, [B2MIm]Br, [DMIm]Br, [HMIm]Br, and [IsoBMIm]Br (FIGS. 3-7, respectively). In each Figure, two working regions or pressure-temperature (p-T) diagrams are depicted; one with a solid line and the other with a dashed line. The solid lines show the region of performance for the LiBr/IL-water working pairs. Additionally, in each figure, a hypothetical working region (shown with dashed lines) for an absorption chiller working with a conventional LiBr-water working pair was overlaid. The hypothetical LiBr-water solution was chosen in the way that it can match the characteristic performance of the LiBr/IL-water working pairs from the point of view of cooling quality (i.e. temperature and pressure in the evaporator).

An acceptable cooling quality (temperature in the evaporator of <8° C.) was achieved for all the IL additives tested as well as the LiBr-water solution counterparts. For the case of [BMIm]Br (FIG. 3), [B2MIm]Br (FIG. 4) and [HMIm]Br IL (FIG. 6) additives, the absorption chillers can operate at lower generator temperatures and hence with better energy efficiency than LiBr absorbent without the additives. This also creates an opportunity for use of lower grade waste heat as an abundant and inexpensive source of thermal energy. However, operating at a lower generator temperature comes with the price of lower cooling quality (a higher evaporator temperature). With use of [BMIm]Br ionic liquid a higher quality (colder) cooling load can be achieved, as indicated in Table 1 by the lower evaporator temperature (2.6° C.) compared with the other examples (5.1-6.3° C.). Therefore, [BMIm]Br IL additive shows the best performance among all the bromide-based ionic liquids tested.

In the case of [DMIm]Br (FIG. 5), performance of the working pair with the IL additive was nearly the same as with pure LiBr. This is indicated by the near superimposition of the two parallelogram-shaped working regions. However, a working pair of LiBr—H$_2$O with [DMIm]Br as an IL additive maintains the advantage over pure LiBr—H$_2$O of having a lower crystallization temperature.

Figure 7:
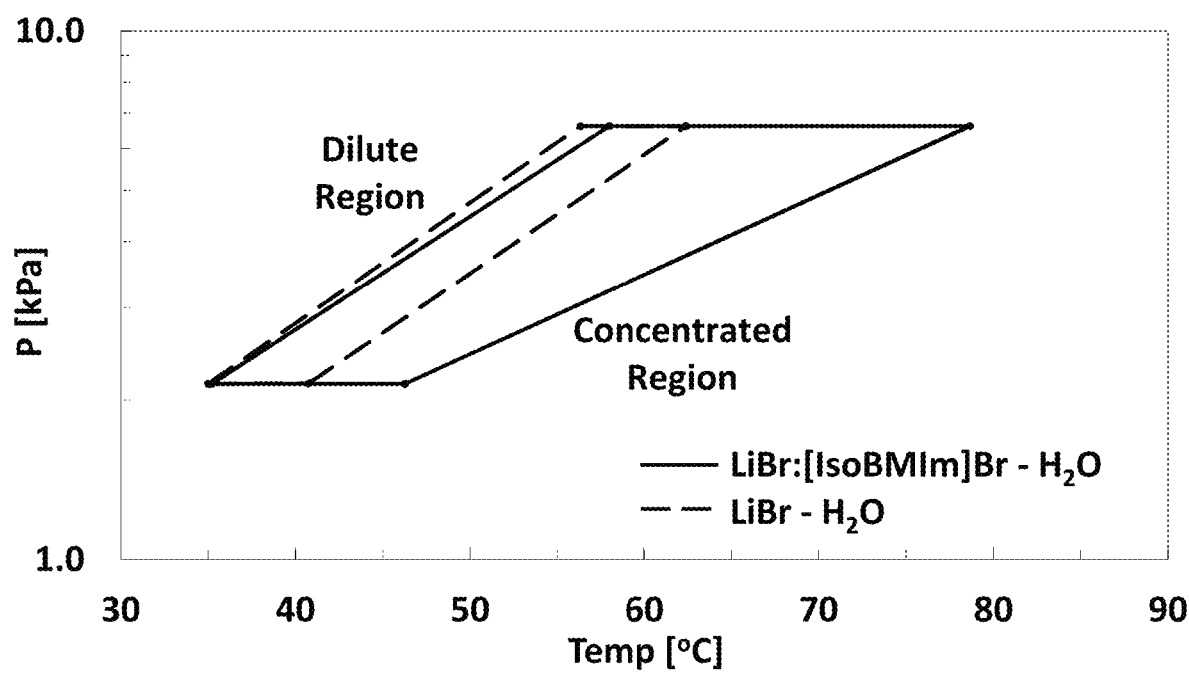
FIG. 7 shows the performance cycle of LiBr:[IsoBMIm]Br (95:5)-water and LiBr-water working pairs.

For the case of [IsoBMIm]Br, as shown in FIG. 7, the absorption chiller needs to operate at higher generator temperatures and hence has worse energy efficiency than a system using LiBr absorbent without the additive, when compared on the basis of the same temperature in the evaporator (it needs a higher temperature heat source). In the case of [IsoBMIm]Br ionic liquid a generator temperature ~20° C. higher (i.e., 80° C. vs 60° C.) would be needed compared to LiBr-water solution to achieve the same evaporator temperature. That means less thermal efficiency and more costly operation.

It is to be understood that the foregoing describes preferred embodiments of the present invention and that modifications may be made therein without departing from the scope of the present invention as set forth in the claims.

What is claimed is:

1. An absorption chiller comprising an absorber compartment and a generator compartment, wherein both compartments comprise a refrigerant and an absorbent, the absorbent comprises 91-97% by weight of LiBr and 3-9% by weight of 1 butyl-3-methylimidazolium bromide.

2. The absorption chiller of claim 1, wherein the refrigerant is water.

3. The absorption chiller of claim 1, wherein the absorbent comprises 93-96% by weight of LiBr and 4-7% by weight of 1 butyl-3-methylimidazolium bromide.

4. The absorption chiller of claim 1, wherein the absorber compartment provides a solution of the refrigerant and the absorbent to the generator compartment, and the weight percent of the absorbent is 52%-57% of the solution.

5. A working pair for use in an absorption chiller, comprising an absorbent and a refrigerant, wherein the absorbent comprises 91-97 wt % of LiBr and 3-9 wt % of 1 butyl-3-methylimidazolium bromide.

6. The working pair of claim 5, wherein the absorbent the absorbent comprises 93-96 wt % of LiBr and 4-7 wt % of 1-butyl-3-methylimidazolium bromide.

7. The working pair of claim 5, wherein the refrigerant is water.

8. An absorption chiller comprising an absorber compartment and a generator compartment, wherein both compartments comprise a refrigerant and an absorbent, the absorbent comprises 95% by weight of LiBr, and 5% by weight of 1-butyl-2,3-dimethylimidazolium bromide or 1,3-dimethylimidazolium bromide.

9. The absorption chiller according to claim 8, wherein the absorbent comprises 95% by weight of LiBr, and 5% by weight of 1-butyl-2,3-dimethylimidazolium bromide.

10. The absorption chiller according to claim 8, wherein the absorbent comprises 95% by weight of LiBr, and 5% by weight of 1,3-dimethylimidazolium bromide.

11. A working pair for use in an absorption chiller, comprising an absorbent and a refrigerant, wherein the absorbent comprises 95% by weight of LiBr, and 5% by weight of 1-butyl-2,3-dimethylimidazolium bromide or 1,3-dimethylimidazolium bromide.

12. The working pair according to claim 11, wherein the absorbent comprises 95% by weight of LiBr, and 5% by weight of 1-butyl-2,3-dimethylimidazolium bromide.

13. The working pair according to claim 11, wherein the absorbent comprises 95% by weight of LiBr, and 5% by weight of 1,3-dimethylimidazolium bromide.

\* \* \* \* \*